United States Patent [19]

Chow et al.

[11] 4,395,520

[45] Jul. 26, 1983

[54] PROCESS FOR CURING THERMOSETTING RESINS USING SULFUR DIOXIDE CONTAINING COMPOUNDS AS LATENT CATALYSTS

[75] Inventors: Sui-Wu Chow; George L. Brode, both of Bridgewater Township; Somerville County, N.J.

[73] Assignee: Union Carbide Corporation, Danbury, Conn.

[21] Appl. No.: 340,852

[22] Filed: Jan. 20, 1982

[51] Int. Cl.³ .................... C08G 8/28; C08G 8/30; C08G 8/32; C08G 12/40
[52] U.S. Cl. .................... 525/502; 264/331.22; 525/505; 525/509; 525/518
[58] Field of Search ............ 264/331; 525/509, 518, 525/502, 505

[56] References Cited

U.S. PATENT DOCUMENTS

| | | | |
|---|---|---|---|
| 2,677,675 | 5/1954 | Nagy | 525/505 X |
| 2,687,397 | 8/1954 | Dannenberg | 525/513 |
| 2,704,750 | 3/1955 | Whitehill et al. | 525/519 X |
| 3,317,474 | 5/1967 | Jones, Jr. | 525/519 X |
| 3,485,797 | 12/1969 | Robins | 260/613 X |
| 4,083,830 | 4/1978 | Gallacher | 525/509 X |
| 4,273,669 | 6/1981 | Piesch et al. | 525/509 X |

Primary Examiner—Howard E. Schain
Attorney, Agent, or Firm—Francis M. Fazio

[57] ABSTRACT

Latent catalysts comprising certain sulfur dioxide containing compounds such as bubadiene sulfone are used in the cure of thermosetting resins which are curable by an acid catalyst.

16 Claims, No Drawings

PROCESS FOR CURING THERMOSETTING RESINS USING SULFUR DIOXIDE CONTAINING COMPOUNDS AS LATENT CATALYSTS

The present invention involves the novel use of certain sulfur dioxide containing compounds as catalysts in the cure of thermosetting resins. These catalysts are latent, being catalytically inactive at lower temperatures, but become catalytically active at temperatures encountered during the curing of the resin.

Thermosetting compositions have been known for many years and have been employed in many applications because of such advantageous properties as light weight, high heat resistance and excellent dimensional stability. The traditional method for processing thermoset molding compounds involves blending with fillers, pigments and other additives, followed by compounding and granulating. The granulated compositions are then fabricated by any of the well known methods such as compression, transfer, or injection molding. This multi-step process is cumbersome and energy intensive. Furthermore, the compounding step often causes considerable attrition of the reinforcing fiber and thus the reinforcing action of the fiber is not efficiently utilized. As a consequence, ultimate high impact resistance is often not obtained.

Recently, there have been devised thermoset fabrication methods in which liquid thermosettable compositions are injected directly into a mold where cure takes place resulting in the formation of a fabricated part. Depending on the injection process and the nature of the compositions, these methods are known as liquid injection molding (LIM), reaction injection molding (RIM), or resin transfer molding (RTM).

Another process for manufacturing high strength thermoset composites is the sheet-molding compound (SMC) method. In this process, a liquid thermosetting resin, such as an unsaturated polyester, reinforcing fiber and other additives are mixed under low shear conditions. The resulting viscous mixture is partially cured to non-tacky sheets. Final cure to finished parts is then carried out in a mold. The commercial applications of this method have been generally limited to unsaturated polyesters which, unless they are specially treated, exhibit poor flammability resistance. In addition, careful formulation is required to obtain good processability and smooth surfaces.

These processes are rapid and adaptable to high speed production requirements, and since the curing reaction is generally exothermic, these processes are less energy intensive than the traditional methods for processing thermosets. Furthermore, because there relatively new thermoset fabrication methods are low pressure processes, there is required considerably lower clamping forces than those required for the injection molding of engineering plastics, and thus lower capital and operating expenditures are required.

It has recently been found that certain resins are particularly adaptable for use in injection molding processes because of their low viscosity and their having a low amount of unbound water. These resins are disclosed in United States patent application Ser. Nos. 340,853 and 340,855 filed concurrently herewith by Brode and Chow and Brode, Chow and Hale respectively. These resins are high-ortho resoles containing hemiformal groups. They are of low viscosity, are essentially free of unbound water and can be cured to phenol-formaldehyde thermoset shapes and when mixed with reinforcing material to composite shapes.

Another class of thermosetting compositions found suitable in injection molding processes are hemiformals of phenol and methylolated phenol and solutions of these hemiformals as disclosed in United States patent applications Ser. No. 340,719 filed by Covitz, Brode and Chow, Ser. Nos. 340,790, and 340,720 filed by Brode and Chow and Ser. No. 340,695 filed by Brode, Chow and Hale, all on Jan. 19, 1982. These compositions are hemiformals formed by the reaction of formaldehyde with the phenol hydroxy and methylol groups of phenol. These compositions are stable and are of low viscosity and can be used to form phenol-formaldehyde reins. They can also be mixed with a co-reactive polymer to form solutions useful in injection molding and curable to solid shapes.

Generally, the catalyst used for curing the above phenol-formaldehyde resins and other thermosetting compositions has been acids or bases. Suitable acid catalysts that have been used include sulfuric acid, phenyl sulfonic acid, phosphoric acid, ferric chloride, toluene sulfonic acid. These acids have been used successfully with thermosetting resins, such as those disclosed above. However, these acids have significant catalytic activity, even at ambient temperatures (20°-30° C.). Therefore, a resin that contains an acid catalyst very quickly begins to gel and form a solid resinous product after the catalyst has been added. Therefore, when used in liquid injection molding processes the acid catalyst is typically mixed with the resin shortly before injection into and mold. A less expensive and more convenient method would be to mix the catalyst with the resin and then store it until it is needed. However, because of the activity of conventional acid catalysts at storage temperatures, an attempt to store a resin containing an acid catalyst would risk gelling and solidification of the resin in the storage areas and process lines. It would, therefore, be highly desirable to have available a catalyst that is latent, namely one that exhibits little or no activity at ambient conditions in which the resin is stored, but becomes catalytically active at the cure conditions found in a mold. Then the catalyst could be added to the resin and the resin stored until use without danger of resin gelling.

It has now been found that certain sulfur dioxide containing compounds can be used as latent catalysts in the curing of thermosetting resins that are curable by an acid catalyst.

These catalysts when mixed with thermosetting resins show little or insignificant activity at storage temperatures, allowing storage of the catalyst-containing resin. However, when exposed to curing temperatures, they become very catalytically active and facilitate rapid curing of the resin.

Generally any sulfone having a double bond in the beta position is suitable for use in the invention. Examples include diene-sulfur dioxide adducts such as butadiene sulfone, and the sulfones of substituted butadienes such as chloroprene and methylbutadiene. Also suitable are the sulfones of $\alpha, \beta$-unsaturated ketones having the general formula:

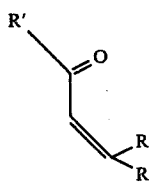

where R' is an alkyl, aryl or alkaryl, and R is an alkyl, aryl, alkaryl or hydrogen. The sulfones of these ketones have the general formula:

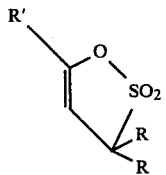

where R and R' are defined as above. Examples include the sulfones of pulegone and isopulegone. Copolymers of sulfur dioxide and olefinic monomer which liberate sulfur dioxide such as bicyclo [2,2,1] hept 2-ene- sulfur dioxide copolymer can also be used.

At storage conditions, below about 60° C., preferably less than 30° C., these latent catalyst exist in the form of the associated sulfone compound. These compounds are neutral and thus have insignificant catalytic activity. However, at cure temperatures, above about 100° C., the sulfones disassociate into its components, liberating sulfur dioxide. The sulfur dioxide reacts with water produced by the heat induced condensation reaction of the resin or water already present in the resin to form sulfurous acid. Sulfurous acid is a strong acid and is effective as a catalyst. Thus, a highly active acid catalyst is produced in situ which effectuates a rapid cure of the resin.

The latent catalyst is introduced in an amount to give a concentration of about 0.2 to about 10 weight percent, preferably about 0.5 to about 5 weight percent, of total obtainable sulfur dioxide, based on the weight of the catalyst free resin.

Resins suitable for use in the method of the invention are thermosetting resins that are curable using an acid catalyst. These include phenol-formamdelyde, urea-formaldehyde, and melamine-formaldehyde resins. Preferably the resins used in the method of the invention are usable in sheet molding compounds or in liquid injection molding processes. If used in sheet molding compound processes, the resin used in the method of invention should have a viscosity less than about 500,000 centipoise (Brookfield) at 25° C.

When used in liquid injection molding processes, the resin should have a viscosity less than about 10,000 centipoise (Brookfield) at 25° C.

Resins suitable for use in the method of the invention include the hemiformals of phenol and methylolated phenol and solutions of these with a co-reactive polymer as disclosed in the above cited United States patent applications, Ser. Nos. 340,719, 340,790, and 340,720. These resins are described as having any one of the formula below:

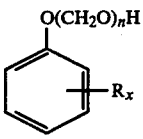

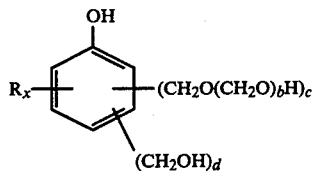

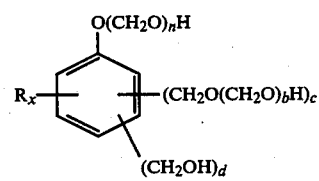

wherein R is any substituent typically employed in conjunction with a phenolic structure, n is a positive number of at least 1, preferably about 1 to about 5, most preferably about 1.2 to about 2.5. b is 1 to about 5, c is 1 to about 3, and d is 0 to about 2, x is 0 to 3, the sum of c and d is at least 1 and no greater than 3 and the sum of c, d, and x is at least 1 but no greater than 5, where $x=0$ for at least 50 mole percent of the hemiformal, and with respect to the R substituent, at least 2 of the ortho- and para- positions are free in relation to the -OH and $-O(CH_2O)_nH$ groups. With respect to R, it is preferably a monovalent radical which includes alkyl from 1 to 18 carbon atoms, cycloalkyl from 5 to 8 carbon atoms, aryl containing from 1 to 3 aromatic rings, aralkyl, alkaryl, alkoxy containing from 1 to 18 carbon atoms, aroxy containing 1 to 3 aromatic nuclei, halide such as chloride, bromide, fluoride and iodide, alkyl sulphido having from 1 to 18 carbon atoms, aryl sulphido having from 1 to 3 aromatic nuclei, and the like, as well as, a radical derived from an oil such as linseed oil or tung oil. Examples of co-reactive polymers are phenol-formaldehyde resoles, phenol-formaldehyde novolacs, aromatic polyesters, aromatic polycarbonates, unsaturated polyesters, poly(aryl-ethers), urea-formaldehyde resin, and melamine-formaldehyde resins.

Also included in the resins suitable for use in the invention are the phenolic resins disclosed in U.S. Pat. No. 3,485,797, issued to Robins on Dec. 23, 1969. These are phenol formaldehyde resins having the general formula

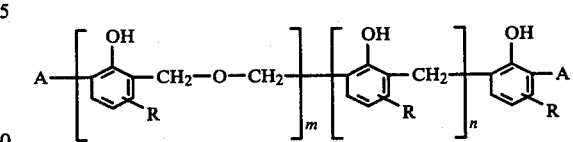

wherein R is hydrogen, hydrocarbon radical, oxyhydrocarbon radical or halogen, meta to the hydroxyl group of the phenol; m and n are numbers the sum of which is at least two and the ratio of m to n is greater than one; and A is a hydrogen or a methylol group, the molar ratio of said methylol group to hydrogen being at least one.

A preferred resin form the method of the invention is disclosed in the above cited patent application, United States Ser. No. 340,853. These resins are high-ortho phenol-formaldehyde resole polymers containing hemiformal groups and having the general formula

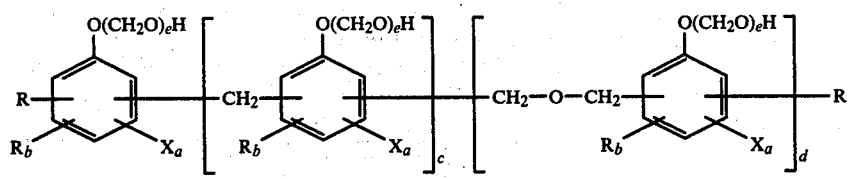

wherein a is from 0 to 3, b is 0 to 1, the sum of a and b does not exceed 3, the sum of c and d is from 2 to about 20, the mole fraction $d/(c+d)$ is 0.4 to 0.9, preferably 0.6 to 0.8, R is $-CH_2O(CH_2O)_eH$, e is 0 to about 5, and X is a monovalent radical; wherein for at least one of the R or $O(CH_2O)_eH$ groups e is at least 1, and wherein at least 50 mole percent of the

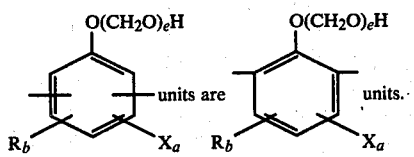

X is any substituent typically employed in conjunction with a phenolic structure. With respect to X, it is preferably a monovalent radical which includes alkyl of from about 1 to about 8 carbon atoms, cycloalkyl from 5 to 8 carbon atoms, aryl containing from 1 to about 3 aromatic rings, aralkyl, alkaryl, alkoxy containing from 1 to about 18 carbon atoms, aroxy containing 1 to 3 aromatic nuclei, halide such as chloride, bromide, fluoride, and iodide; alkyl sulphides having from 1 to about 18 carbon atoms, aryl sulphides having from 1 to about 3 aromatic nuclei, and the like. These resins are essentially free of water not incorporated into the polymer structure and have a low viscosity, as low as 1,000 centipoise (Brookfield) at 25° C. By essentially free of water is meant that the resin contains less than about 5 weight percent, preferably less than about 2 weight percent, of unbound water or volatile organic compounds, based on the total weight of the resin. Concentrations less than 1 weight percent are achievable. By unbound water is meant that water present as impurity and is distinguished from the water produced from the condensation reation occurring during cure of the prepolymer. Volatile organic substances are those that volatilize to form a gas when the resin is exposed to elevated temperatures, about 100° C. These include formaldehyde not incorporated in methylol groups, hemiformal groups on methylol linkages of the resin. Also included are the solvents typically used to reduce the viscosity of a resin, such as alcohol or aromatic hydrocarbons. Also included are such substances such as methanol that may be introduced as contaminants in the formaldehyde or phenol used in manufacture of the resin. The resin containing the latent catalyst can be cured using known methods in the art. The preferred curing method is any one of the liquid injection molding processes wherein the resin is injected into a mold, and cured by heating the mold. The catalyst may be premixed with the resin and stored before the curing. The catalyst containing resin is stable at storage temperatures with stability decreasing as the temperature rises. Storage temperature lower than 60° C. are suitable although storage temperatures lower than 30° C. are preferred.

The catalyst containing resins can be cured at temperatures between about 100° C. and about 200° C., preferably between 150° C. and about 160° C. The optimum curing temperature for the most rapid cure rate depends in large part on the kinetic properties and the equilibrium properties of the particular latent catalyst used. For butadiene sulfone, the optimum curing temperature is about 150° C.

The rate of the cure can be regulated by the cure temperature and the concentration of the catalyst.

Optionally, resins containing the latent catalyst may be blended with a reinforcing material such as glass fiber, graphite fiber, carbon fiber, wollastonite, cellulousic fibers such as wood flour and the like, organic fibers such as aromatic polyamide fibers, and mica. The preferred reinforcing materials are glass fiber, graphite fiber, carbon fiber, and aromatic polyamide fiber. These fibers may be in any form common in the art, such as chopped fiber, mat, and woven cloth.

When used in sheet molding compound processes, the catalyst-containing resins can be blended with a chopped fiber and cured to a B-stage resin and then later to finished composite shapes.

In liquid injection molding processes, the fiber may be placed in any suitable form into the mold before injection of the catalyst-containing resin.

The following examples demonstrate the invention and are not intended to limit the invention in any way.

EXAMPLE 1

Evaluation of butadiene sulfone as a latent catalyst was were made by obtaining differential scanning calorimetric data (DSC) and the viscosity vs. time relationships.

DCS is a method for determining the catalytic activity of a catalyst. The cure of phenol-formaldehyde resins is exothermic; therefore, the temperature of the exothermic peak of a DSC spectrum is a measure of the temperature where the most rapid cure rate occurs and the activity of the catalyst during cure.

The relationship of viscosity vs. time is a measure of stability at a given temperature. The stability can be measured by the time it takes the viscosity to double. An increase in viscosity indicates reaction of the resin to form higher molecular weight products.

A latent catalyst, butadiene sulfone, was evaluated as well as two conventional acid catalysts, diphenyl hydrogen phosphate and sulfuric acid. Each catalyst was added to a resin at a concentration of 2 weight percent of the compound in question, based on the weight of the catalyst free resin.

The polymer used was a phenol-formaldehyde resole resin having hemiformal groups as disclosed in the above cited United States application Ser. No. 340,853. It was made by charging into a batch distillation apparatus having a 5 gallon vessel and equipped with a water separator 7058 grams of phenol, 35.3 grams of zinc acetate dihydrate and 494 grams of toluene. The solution was stirred and heated to about 100° C., after which 9206 grams of an aqueous solution of formaldehyde containing 48.9 weight percent formaldehyde were metered into the reaction mixture over five hours. There was an initial mild exotherm, which was easily moderated by regulating the source of heat. Water added with the formaldehyde was then removed azeotropically with the toluene using the water separator as a condenser. After all the aqueous formaldehyde solution had been added, the mixture was azeotropically distilled for about 1.5 hours at atmospheric pressure to a temperature of about 108° C. The toluene and water were removed as an azeotropic vapor mixture which was condensed using the water separator. The heat-source was then removed and the distillation continued under a reduced pressure of about 50 mmHg for about one-half hour. Total water recovered corresponded to about 100°/° of the water added in the aqueous formaldehyde solution. The resulting composition has a viscosity (Brookfield Model RVT) of 3900 cp at 29° C.

Resins containing the catalysts and a catalyst-free resin, for comparison, were evaluated for activity at cure temperatures by using standard differential calorimeter apparatus and the peak exotherm determined. The calorimeter was a Dupont Differential Thermoanalyzer Model 990 equipped with a pressure cell. The data are summarized in Table I. As seen by the peak exotherms, shown in Table I, the curing activity of the latent catalyst of the invention approaches the activity of a conventional catalyst used in the art, diphenyl hydrogen phosphate.

Catalyst containing resins were evaluated for stability at storage temperatures by allowing them to stand at a temperature of 25° C. to 30° C. and the time determined in which the viscosity doubled. These times ($t_2$) for each resin are shown in Table I. As shown by these times, the stability of the resin containing the latent catalyst is significantly greater than resins containing conventional catalysts. The decreased stability of the butadiene sulfone latent catalyst was probably due to sulfur dioxide impurity.

TABLE I

| Catalyst | Peak Evotherm Temperature (°C.) | $t_2$ (days) |
| --- | --- | --- |
| None | 219 | 250 |
| Butadiene sulfone* | 127 | 14 |
| Diphenyl hydrogen phosphate** | 127 | 0.17 |
| Sulfuric acid** | — | <0.1 |

*Latent catalyst
**Conventional acid catalyst

EXAMPLE 2

A thermosetting resin was prepared as in Example 1 and butadiene sulfone was added to the resin as a latent curing catalyst.

The resin was cured using an injection molding apparatus described in U.S. patent application Ser. No. 135,906, filed Apr. 14, 1980 by Angell. Fiberglass mat was placed into a mold, the mold was preheated to 150° C. and clamped with a hydraulic press. An exothermic reaction ensued. When the mold cooled to its initial preheated temperature of about 150° C., the cured composite plaques were removed from the mold. The cycle times were measured and are shown in Table II.

The glass fiber used was glass fiber mat, designated as type AKM and available from PPG Industries, Pittsburgh, Pa.

In Table II are summarized the glass content expressed as weight percent, based on the weight of the cured composite, mold cycle time in seconds, and the concentration of the catalyst expressed as weight percent butadiene sulfone based on the weight of the catalyst-free resin.

TABLE II

| Butadiene Sulfone Conc. (wt. %) | Wt. % Glass | Mold Cycle (sec) |
| --- | --- | --- |
| 1 | 56 | 260 |
| 2 | 54 | 300 |

The data on Table II show short cycle times, demonstrating the excellent catalytic properties of the latent catalysts used in the invention.

We claim:

1. In a process for the curing of a thermosetting resin which is curable using an acid catalyst, the improvement being the use of a sulfur dioxide containing compound as a latent catalyst, said compound being stable at at a temperature less than about 60° C. and dissociable into sulfur dioxide at a temperature greater than about 100° C.

2. A process as in claim 1 wherein said compound is a sulfone with a double bond in the beta position.

3. A process as in claim 1 wherein said compound is a diene-sulfur dioxide adduct.

4. A process as in claim 1 wherein said compound is a sulfone of a $\alpha,\beta$-unsaturated ketone.

5. A process as in claim 1 wherein said compound is a copolymer of sulfur dioxide and an olefinic monomer.

6. A process as in claim 3 wherein said adduct is butadiene sulfone.

7. A process as in claim 4 wherein said sulfone is pulegone sulfone or isopulegone sulfone.

8. A process as in claim 1, 2, 3, 4, 5, 6 or 7 wherein the thermosetting resin comprises a hemiformal having any one of the following structures:

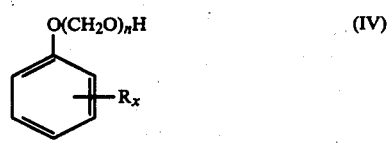

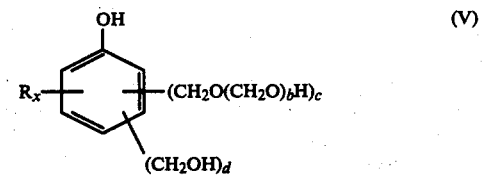

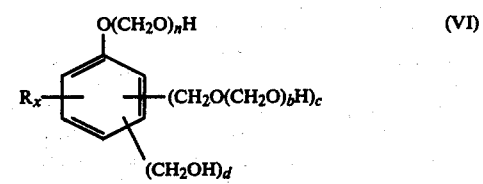

wherein R is a monovalent radical selected from the group consisting of alkyl from 1 to 18 carbon atoms, cycloalkyl from 5 to 8 carbon atoms, aryl containing from 1 to 3 aromatic rings, aralkyl, alkaryl, alkoxy containing from 1 to 18 carbon atoms, aroxy containing 1 to 3 aromatic nuclei, a halide radical, alkyl sulphido having from 1 to 18 carbon atoms, aryl sulphido having from 1 to 3 aromatic nuclei, and a radical derived from linseed oil or tung oil, n is a positive number of at least 1, b is 1 to about 5, c is 1 to about 3, and d is 0 to about 2, x is 0 to 3, the sum of c and d is at least 1 and no greater than 3 and the sum of c, d, and x is at least 1 but no greater than 5, where x=0 for at least 50 mole percent of the hemiformal, and with respect to the R substituent, at least 2 of the ortho- and para- positions are free in relation to the —OH and —O(CH$_2$O)$_n$H groups.

9. A process as in claim 1, 2, 3, 4, 5, 6 or 7 wherein the thermosetting resin comprises a phenol-formaldehyde resin having the formula:

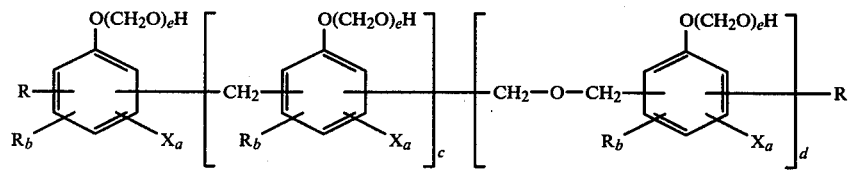

wherein a is from 0 to 3, b is 0 to 1, the sum of a and b does not exceed 3, the sum of c and d is from 2 to about 20, the mole fraction d/(c+d) is 0.4 to 0.9, R is —CH$_2$O(CH$_2$O)$_e$H, e is 0 to about 5, and X is a monovalent radical selected from the group consisting of alkyl from 1 to 18 carbon atoms, cycloalkyl from 5 to 8 carbon atoms, aryl containing from 1 to 3 aromatic rings, aralkyl, alkaryl, alkoxy containing from 1 to 18 carbon atoms, aroxy containing 1 to 3 aromatic nuclei, a halide radical, alkyl sulphides having from 1 to 18 carbon atoms, and aryl sulphides having from 1 to 3 aromatic nuclei; wherein for at least one of the R or O(CH$_2$O)$_e$H group, e is at least 1, and wherein at least 50 mole percent of the

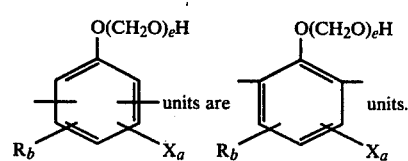

10. A process as in claim 8, said process being a liquid injection process wherein the thermosetting resin is injected directly into a mold.

11. A process as in claim 9, said process being a liquid injection process wherein the thermosetting resin is injected directly into a mold.

12. A process as in claim 8, said process being a sheet moldings compound process.

13. A process as in claim 9, said process being a sheet moldings compound process.

14. A process according to claim 8 wherein n is from about 1 to about 5.

15. A process according to claim 8 wherein n is from about 1.2 to about 2.5.

16. A process according to claim 9 wherein the mole fraction (d/c+d) is from 0. to 0.8.

* * * * *

UNITED STATES PATENT AND TRADEMARK OFFICE
CERTIFICATE OF CORRECTION

PATENT NO. : 4,395,520
DATED : July 26, 1983
INVENTOR(S) : Sui-Wu Chow et al.

It is certified that error appears in the above-identified patent and that said Letters Patent is hereby corrected as shown below:

Column 5, line 1, "form" should read -- for --.

Column 5, line 32, "8 carbon atoms" should read -- 18 carbon atoms --.

Column 6, line 48, "DCS" should read -- DSC --.

Column 10, claim 16, line 37, "0." should read -- 0.6 --.

Signed and Sealed this

Twentieth Day of December 1983

[SEAL]

Attest:

GERALD J. MOSSINGHOFF

Attesting Officer

Commissioner of Patents and Trademarks